United States Patent
Fazio et al.

(10) Patent No.: US 9,714,010 B2
(45) Date of Patent: Jul. 25, 2017

(54) FOAM/LIQUID APPLICATOR WITH AN INTERNAL LIGHTING SYSTEM AND A CARWASH SYSTEM HAVING THE FOAM/LIQUID APPLICATOR

(71) Applicant: SONNY'S ENTERPRISES, INC., Tamarac, FL (US)

(72) Inventors: Paul Fazio, Plantation, FL (US); Anthony Analetto, Weston, FL (US)

(73) Assignee: SONNY'S ENTERPRISES INC., Tamarac, FL (US)

( * ) Notice: Subject to any disclaimer, the term of this patent is extended or adjusted under 35 U.S.C. 154(b) by 801 days.

(21) Appl. No.: 14/194,012

(22) Filed: Feb. 28, 2014

(65) Prior Publication Data

US 2015/0246661 A1    Sep. 3, 2015

(51) Int. Cl.
| | |
|---|---|
| *B60S 3/04* | (2006.01) |
| *B05B 7/32* | (2006.01) |
| *B08B 3/00* | (2006.01) |
| *B08B 3/02* | (2006.01) |
| *F21V 33/00* | (2006.01) |
| *B01F 5/06* | (2006.01) |
| *B01F 3/04* | (2006.01) |
| *F21Y 115/10* | (2016.01) |

(52) U.S. Cl.
CPC ............ *B60S 3/04* (2013.01); *B01F 3/04446* (2013.01); *B01F 5/0697* (2013.01); *B05B 7/32* (2013.01); *B08B 3/003* (2013.01); *B08B 3/028* (2013.01); *B60S 3/044* (2013.01); *F21V 33/00* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| RE36,483 E | 1/2000 | Chase | |
| 7,438,075 B1 | 10/2008 | Huntington et al. | |
| 8,069,867 B2 | 12/2011 | Turner et al. | |
| 8,453,657 B2 | 6/2013 | Belanger | |
| 8,511,326 B1 | 8/2013 | Ennis | |
| 2011/0197922 A1* | 8/2011 | Turner | B60S 3/04 134/18 |
| 2011/0277792 A1 | 11/2011 | Turner et al. | |
| 2012/0318310 A1 | 12/2012 | Turner et al. | |

OTHER PUBLICATIONS

Screencapture of www.newinnovations.us for May 2013.*

* cited by examiner

*Primary Examiner* — Michael Barr
*Assistant Examiner* — Jason Riggleman
(74) *Attorney, Agent, or Firm* — Laurence A. Greenberg; Werner H. Stemer; Ralph E. Locher

(57) ABSTRACT

A foam/liquid applicator system for an automated carwash has at least one foam generator with a first end, a second end, a first input for receiving air, and a second input for receiving a detergent mixture. The foam generator transforms the air and the detergent mixture into foam. A light chamber is attached to the first end of said foam generator and receives the foam formed in the foam generator, the light chamber has a plurality of openings for dispensing. A light bar is disposed in the light chamber and has a plurality of lights for illuminating the foam as it is expelled via the openings.

19 Claims, 4 Drawing Sheets

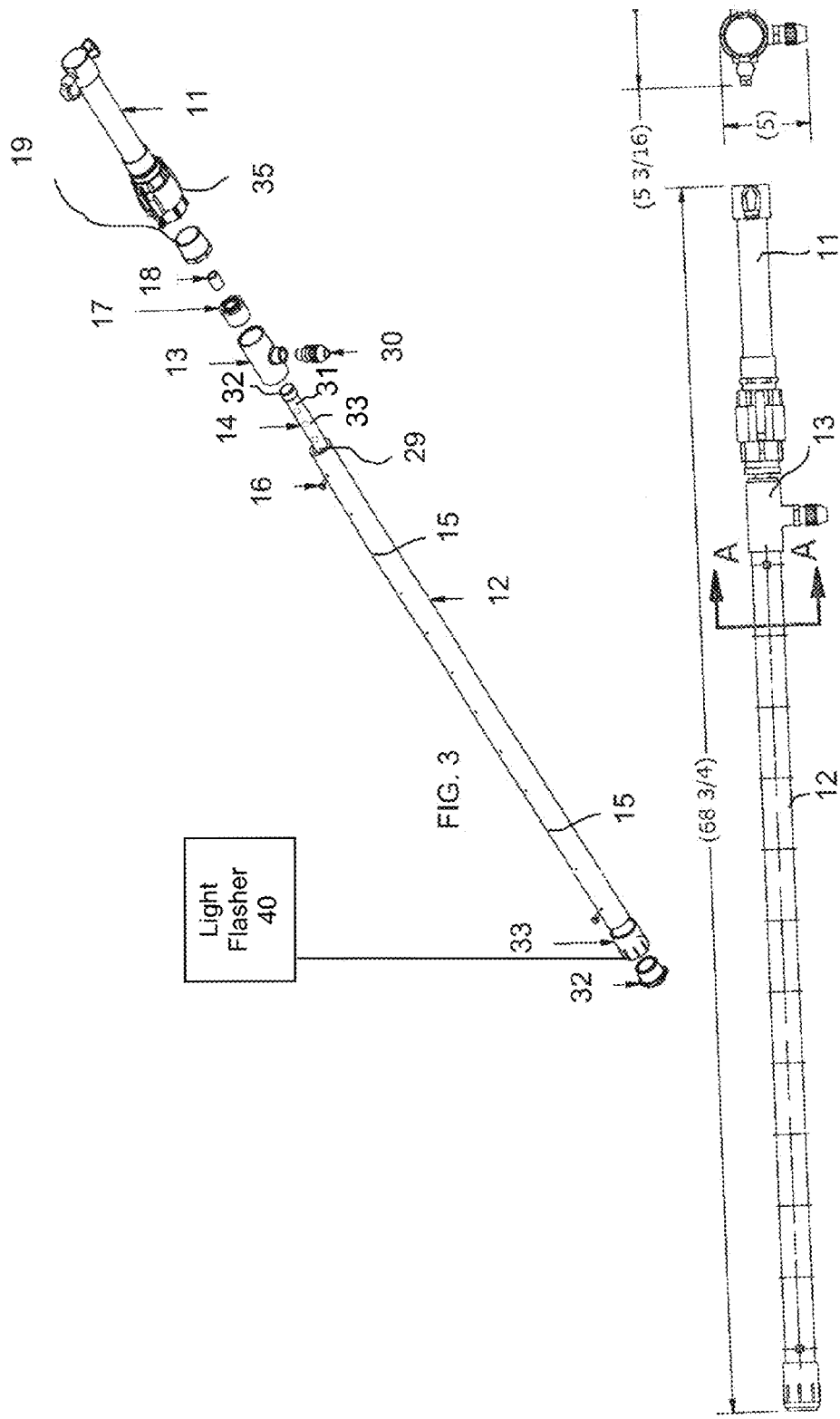

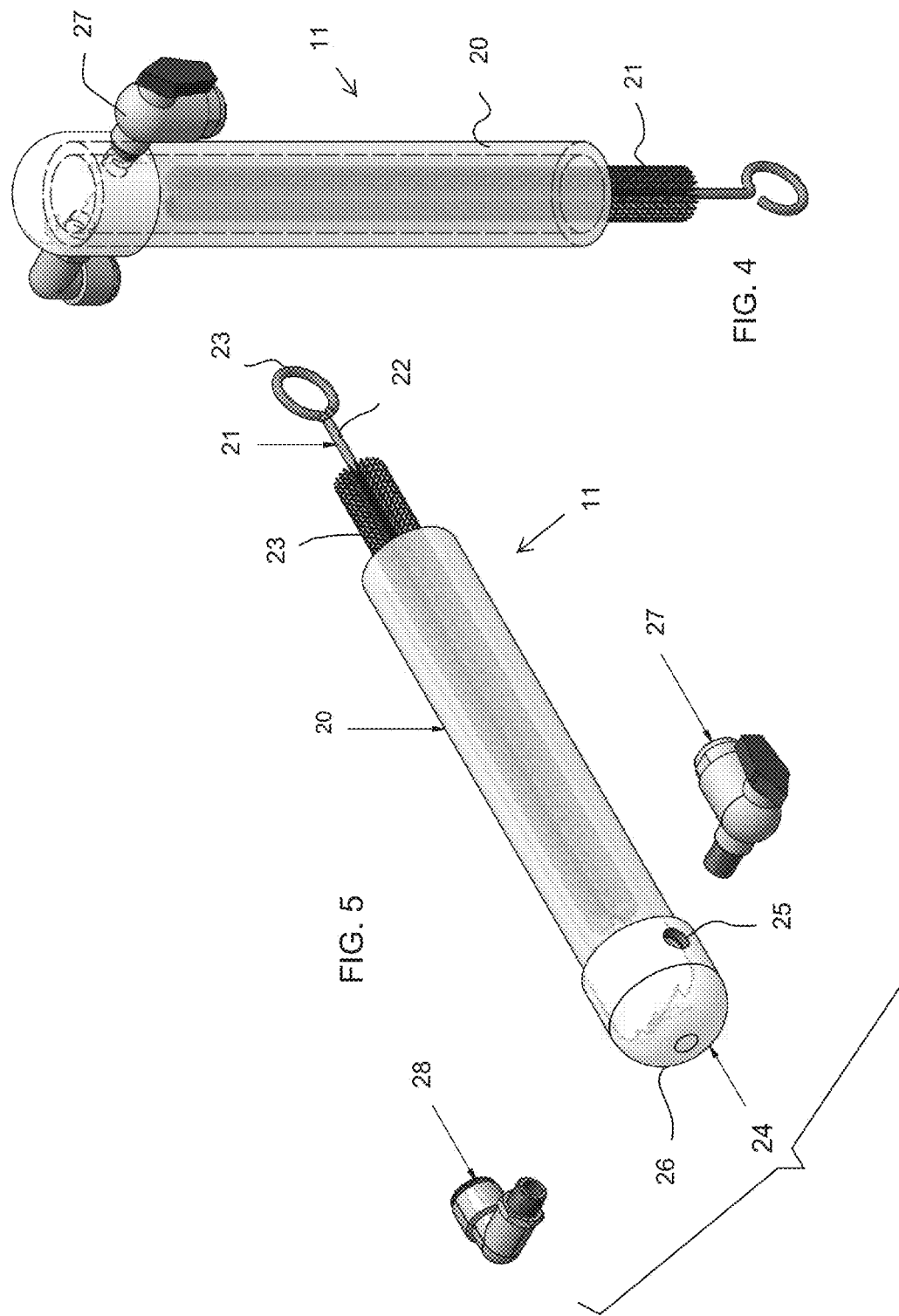

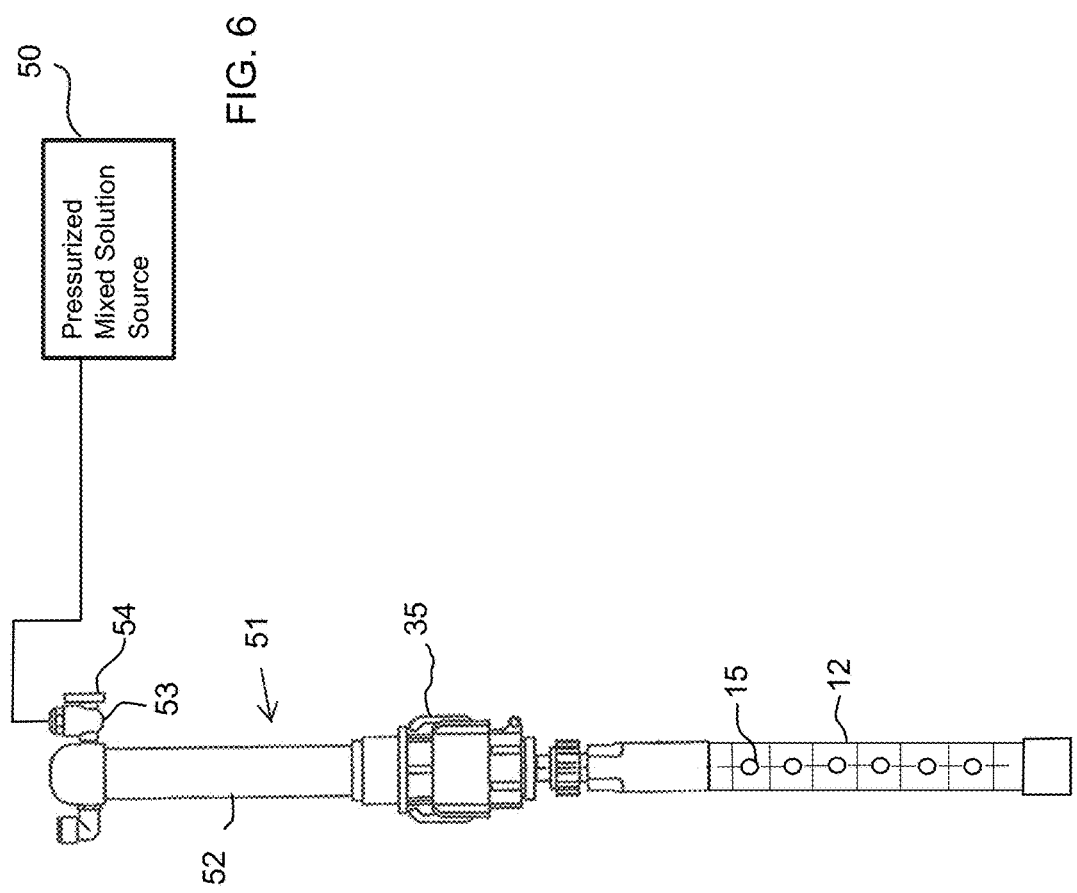

FOAM/LIQUID APPLICATOR WITH AN INTERNAL LIGHTING SYSTEM AND A CARWASH SYSTEM HAVING THE FOAM/LIQUID APPLICATOR

BACKGROUND OF THE INVENTION

Field of the Invention

The invention relates, generally, to a foam/liquid applicator, and more specifically, it relates to a foam/liquid applicator with a built-in or internal lighting system.

The foaming/liquid applicator applies a mixture of water, wax and/or detergent for use in a vehicle washing unit for washing cars, trucks, vans, buses, or indeed any other vehicle or device. For convenience, such a vehicle washing unit will be referred to as a carwash apparatus hereinafter.

In washing cars, a mixture of water, wax and/or detergent is applied to the vehicle and left for a period of time to enable the water-wax-detergent mixture to penetrate through to the finish of the vehicle. This is then normally rinsed off with either hot or cold water. The water-wax-detergent mixture may be hot or cold. It is important that the water-wax-detergent mixture should remain on the vehicle for as long as possible to enable adequate penetration. Thus, it is preferable that the water-wax-detergent mixture should be applied to the vehicle and to adhere to the vehicle for an extended period. It has been found that where the water-wax-detergent mixture is applied in foam form it remains as a result of surface tension for longer periods.

To further enhance the vehicle washing experience, the dispensed foam or detergent mixture as it falls towards a vehicle is lit up with colored lighting. The colored light is absorbed by the foam or detergent mixture and the foam or detergent mixture exhibits the same color as the colored lighting as it falls towards a vehicle. An individual seated in a vehicle experiences or visualizes an avalanche of colored foam falling about the vehicle, thus providing a more entertaining carwash experience.

U.S. Pat. No. 8,069,867 to Turner et al. teaches a U-shaped archway having a conduit for a cleaning fluid. Attached to the archway is a plurality of nozzles for releasing the fluid toward a passing vehicle. At the top of the archway is a signage area. Attached to the exterior of the U-shaped archway and extending from one side of the archway to the other are clear tubular plastic lighting members. The lighting members contain a plurality of LEDs providing both white and colored lighting. The lighting members provide light for the centralized signage and provide a neon-like lighting experience.

U.S. Pat. No. 8,511,326 to Ennis teaches a bubble tank system that collects water and a soap mixture which then overflows out of the tank and provides a gravity fed waterfall that dumps a relatively large volume of water and bubbles onto a passing vehicle. In one embodiment the bubble tank system has a fixed overhead lighting system which directs light down toward the falling bubbles and can be formed to illuminate the signage.

In essence the prior art teaches add-on lighting systems that are disposed above and/or on a side of a foam or water/soap dispensing system for enhancing the viewing pleasure of persons traversing a car washing bay. However, the add-on lighting fixtures stick out from the carwash infrastructure and are thus susceptible to being damaged. In addition, they are added onto the existing infrastructure rather than being part of the infrastructure which adds cost and complexity. Furthermore, the lighting systems are spaced from the foam dispensing system and only partially illuminate the falling foam or liquid.

SUMMARY OF THE INVENTION

It is accordingly an object of the invention to provide a foam/liquid applicator with an internal or built-in lighting system and a carwash system having the foam/liquid applicator that overcomes the herein-mentioned disadvantages of the heretofore-known devices of this general type, which provides a superior lighting experience and is less expensive to manufacture.

With the foregoing and other objects in view there is provided, in accordance with the invention, a foam generating system for an automated carwash. The foam generating system contains a foam generator having a first end, a second end, a first input for receiving air, and a second input for receiving a detergent-wax mixture. The foam generator transforms the air and the detergent-wax mixture into foam. A light chamber is attached to the first end of the foam generator and receives the foam formed in the foam generator. The light chamber has a plurality of openings formed therein for dispensing the foam. A light bar is disposed in the light chamber and has a plurality of lights for illuminating the foam as it is expelled via the openings. In this manner, the originally white foam absorbs the colored light at the source and gives an enriched visual affect to those sitting in a vehicle watching the colored foam falling to the vehicle. In other words, the white foam takes on the coloring provided by the light bar. In addition, no lighting related parts stick out away from the foam generators and are therefore less susceptible to damage.

In accordance with an added feature of the invention, nozzles are disposed in the openings of the light chamber for ejecting the foam. In this manner a more controlled or directed stream of colored foam is possible via the type of nozzle.

In accordance with another feature of the invention, the light chamber has a removable cap for allowing easy access to and replacement of the light bar. In this manner the light bars can easily be replaced with limited down time.

Ideally, a light flasher is connected directly or wirelessly to the light bar for controlling an operation of the light bar. In this manner a direct continuous lighting can be provided. In the alternative, a flashed lighting experience can also be provided by turning the LEDs off and on. In addition, certain colored LEDs can be turned off while other colors are turned on for controlling the light color selection.

In accordance with an added feature of the invention, the light chamber has an interior wall and the light bar has an exterior wall defining a gap therebetween. The foam flows from the foam generator to the openings via the gap. Ideally, the light chamber is made of a plastic such as PVC.

In accordance with another feature of the invention, the first input of the foam generator is an adjustable ball valve and the second input of the foam generator is a full cone nozzle.

In accordance with yet another feature of the invention, the plurality of lights of the light bar are light emitting diode (LED) lights. LEDs provide powerful lighting and yet consume little electricity. The light bar has a waterproof housing being hydrocarbon insensitive for protecting the LEDs.

In accordance with an added additional feature of the invention, a reducing tee socket is disposed between the foam generator and the light chamber. The light bar has an end supported in the reducing tee socket.

In accordance with a concomitant feature of the invention, the foam generator has a gator cam lock fitting for releasably connecting to the light chamber. Because a gator cam lock fitting is a quick release connector, the foam generator can be quickly detached from the light chamber for service or replacement.

With the foregoing and other objects in view there is further provided, in accordance with the invention, a carwash system for an automated carwash. The carwash system contains an air source for supplying air, a control valve, a detergent source for supplying detergent and connected to the control valve, and a water source for supplying water and connected to the control valve. The control valve mixes the detergent with the water forming a foaming mixture. A foam generating system is connected to the control valve and the air source. The foam generating system contains a plurality of foam generators each having a first end, a second end, a first input connected to the air source for receiving the air, and a second input connected to the control valve and receiving the foaming mixture. The foam generators transform the air and the foaming mixture into foam. Light chambers are provided and a respective one of the light chambers is attached to the first end of each of the foam generators and receives the foam formed in a respective one of the foam generators. The light chambers each have a plurality of openings for dispensing the foam. Light bars are provided and, a respective one of the light bars is disposed in each of the light chambers and each have a plurality of lights for illuminating the foam as it is expelled via the openings.

With the foregoing and other objects in view there is additionally provided, in accordance with the invention, a liquid applicator system for an automated carwash. The liquid applicator system contains a liquid applicator having a first end, a second end, and an input for receiving a mixed solution. A light chamber is attached to the first end of the liquid applicator and receives the mixed solution. The light chamber has a plurality of openings for dispensing the mixed solution. A light bar is disposed in the light chamber and has at least one light for illuminating the mixed solution as it is expelled via the openings.

Other characteristic features of the invention are set forth in the appended claims.

Although the invention is illustrated and described herein as embodied in a foam/liquid applicator having an internal lighting system and a carwash system having the foam/liquid applicator, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

BRIEF DESCRIPTION OF THE SEVERAL VIEWS OF THE DRAWINGS

FIG. 2 is a diagrammatic, side view of a foam generator assembly;

FIG. 3 is an exploded perspective view of the foam generator assembly;

FIG. 4 is a perspective view of a part of a foam generator;

FIG. 5 is a partially exploded, perspective view of the foam generator; and

FIG. 6 is an illustration of an automated carwash having a liquid applicator system according to the invention.

DETAILED DESCRIPTION OF THE INVENTION

Figure 1:
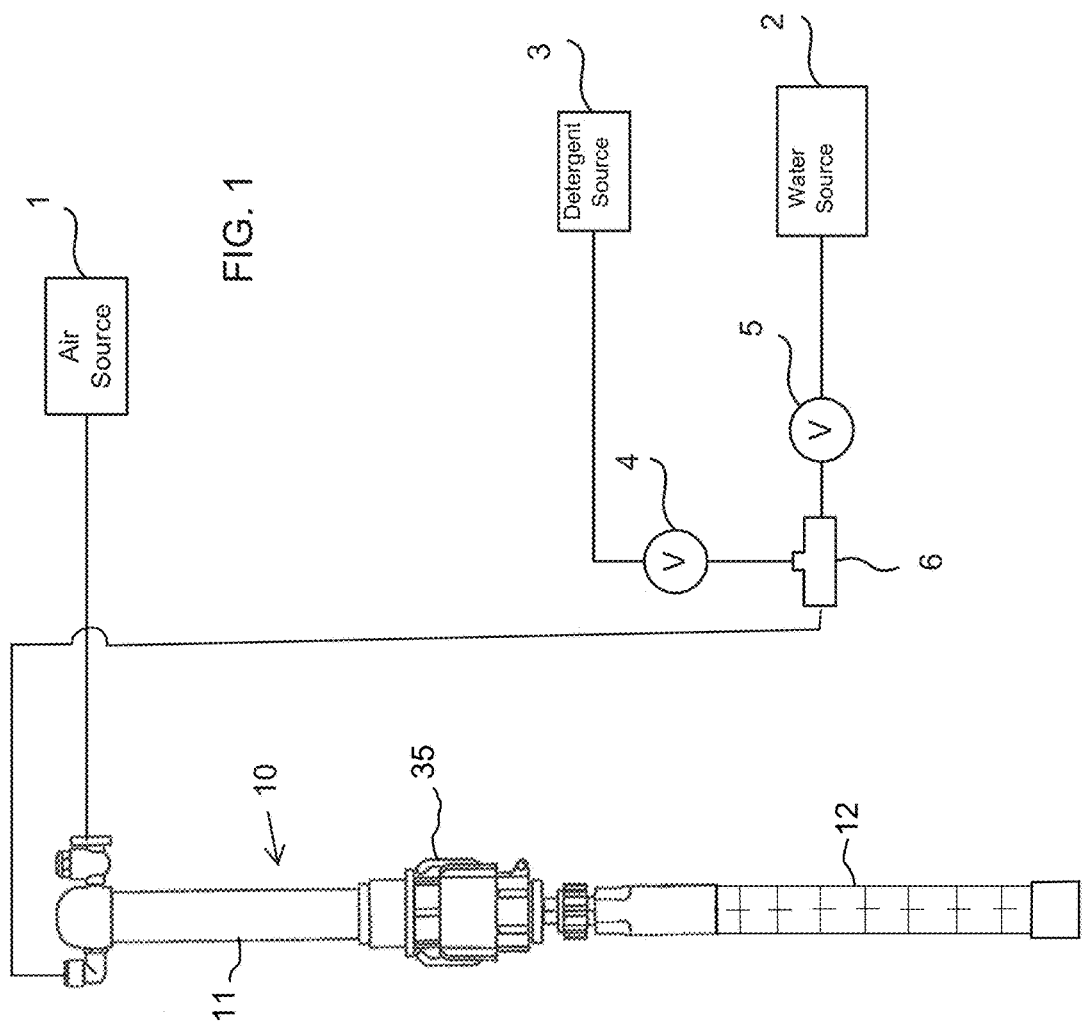
FIG. 1 is an illustration of an automated carwash having a foam generating system according to the invention.

In all the figures of the drawing, sub-features and integral parts that correspond to one another bear the same reference symbol in each case. Referring now to the figures of the drawings in detail and first, particularly, to FIG. 1 thereof, there is shown a foam generation system for an automated car wash. The foam generation system includes an air source 1, a water source 2, and a cleaning fluid (detergent) source 3 such as a cleaning chemical source, wax and/or a soap source. The water and cleaning sources 2, 3 are combined via a control valve 6 and pumps 4, 5 to which a plurality of foam generator assemblies 10 are attached, of which only one is illustrated. The air source 1 is also connected to the foam generator assemblies 10.

FIG. 2 shows a side view of a single foam generator assembly 10. The foam generator assembly 10 contains a foam generator 11 connected to a first end of a light chamber 12 via a reducing tee socket 13, a bushing 17, a nipple 18 and a connector 19 (see FIG. 3). A strain relieve 30 is attached to the reducing tee socket 13.

As shown in FIG. 3, a light bar 14 is contained in the light chamber 12. The light bar 14 contains a plurality of diagrammatic illustrated light emitting devices 33 such as laser emitting diodes 33 (LEDs). The LEDs 33 ideally output either a single light color or optionally a plurality of light colors. Of course the light emitting devices 33 can also emit white light. The light chamber 12 also contains a plurality of holes 15 functioning as nozzles for ejecting a stream of foam and/or water-detergent mixtures. Instead of holes 15, nozzles 16 can be incorporated into the holes 15.

FIGS. 4 and 5 show the foam generator 11 in greater detail. The foam generator 11 has a body or housing 20 generally formed as a pipe preferable a PVC pipe 20 or a metallic pipe 20. Inserted in the housing 20 is a foamer brush 21 (bottle brush). The foamer brush 21 has a rod 22 and a plurality of bristles 23 made from a plastic, composite or metallic material extending from the rod 22. A first end or bottom end of the rod 22 ends in an eyelet 23 that extends out of a bottom end of the housing 20. The eyelet 23 allows for a quick removal and cleaning of the foamer brush 21.

At one end of the foam generator 11 is a cap 24 having left and right threaded bores 25, 26 formed therein. Inserted in the right threaded bore or opening 25 is an air nozzle 27 with a control valve. The air nozzle 27 is an adjustable, elbow ball valve 27 ideally being ¼-⅜ inches. The air supply 1 is attached to the air nozzle valve 27 and allows air to flow into the housing 20 in a controlled manner via the control valve.

Threaded in the left threaded bore or opening 26 is a machined, full cone nozzle 28. The cone nozzle 28 is connected to the control valve 6 which supplies it a water-detergent mixture. Assisted by the rush of air entering via the air nozzle 27 the partially foamed water-detergent mixture is pushed along the foamer brush 21 for further foaming of the water-detergent mixture (hereafter the foamed mixture). The foamed mixture is then pushed into the light chamber 12 and expelled via the holes 15 or nozzles 16.

As shown in FIG. 3, the foam generator 11 has an end with a gator cam lock fitting 35. The gator cam lock fitting 35 allows for a quick release connection of the foam generator 11 to the light chamber 12. Via the gator cam lock fitting 35, the foam generator 11 can be separated allowing for easy access to the component parts for cleaning and servicing. Ideally the gator cam lock fitting 35 is a male adapter 1½ inch female NPT.

The light bar 14 is held in the middle of the light chamber 12 so that the foamed mixture flows in a gap 29 formed between an interior wall of the cylindrical light chamber 12 and an exterior wall of a housing 31 of the light bar 14. At a second end of the light chamber 12 is a threaded end cap 32 which can be screwed off for replacing or servicing the light bar 14. The light bar 14 is held in an end section 33 of the light chamber 14 and the end section has a threading for receiving an external threading of the end cap 32. The opposite end of the light bar 14 is held in the reducing tee socket 13.

An external light flasher 40 is electrically or wirelessly connected to the light bar 14 for controlling the light bar 14 (e.g. for turning the light bar 14 on and off). The light bar 14 ideally outputs green, blue, red, orange, white and yellow lights individually or in combination. Of course further customization of the light coloring is possible. The light bar 14 can be operated at three levels of light intensity including a. accent lighting at 0.5-2 watts/foot, b. wall washer lighting at 3.5-8 watts/foot, and c. flood lighting at 12-25 watts/foot.

The light bar 14 to survive in such a harsh environment has a potted waterproof housing 31 with water proof connectors 32 and is made of a lightweight impact resistance material that is hydrocarbon insensitive.

As the light bar 14 is incorporated into the foam generator system 10, it is now an integral part and is not an add-on feature. Therefore the light bar 14 is protected from accidently being knocked down or damaged as so often happens in add-on lighting systems. Additional, the light affect on the foam is superior to that of the add-on prior art lighting systems as the light coloring is affected at the source of the foam generation and is absorbed by the foam before it is ejected to a passing vehicle. More specifically, the foam absorbs the color and therefore is visually seen as colored foam. Therefore the viewing pleasure of the carwash user is enhanced by a more thoroughly light foaming action. In addition, the integrated lighting system is less complex and less expensive to manufacture.

FIG. 6 shows a second embodiment of the invention. In the second embodiment, only a single pressurized mixed solution source 50 is provided. The mixed solution contains a mixture of water, cleaning chemicals, soaps and/or waxes. The mixed solution is provided under pressure to a liquid applicator system 51 having a liquid applicator 52 directly connected to the light chamber 12. The liquid applicator 52 has an input nozzle 53 with an adjustable, elbow ball valve 54 for controlling the flow of mixed solution flowing into the liquid applicator 52. The liquid applicator 52 directly injects the mixed solution into the light chamber 12 wherein the mixed solution is ejected via the holes 15 or nozzles 16 onto passing vehicles. In the second embodiment, the light chamber 12 is the same as the light chamber in the first embodiment. FIG. 6 shows only one liquid applicator system 51 however, it is clear that the pressurized mixed solution source 50 would supply mixed solution to a plurality of liquid application systems 51.

The second embodiment does not have a dedicated foam generator as in the first embodiment. Rather the liquid applicator 52 has a body or housing generally formed as a pipe preferable a PVC pipe or a metallic pipe. The liquid applicator 52 provides an internal chamber for receiving the mixed solution and transports the mixed solution to the light chamber 12.

At one end, the liquid applicator 52 has an end with the gator cam lock fitting 35. The gator cam lock fitting 35 allows for a quick release connection of the liquid applicator 52 to the light chamber 12. Via the gator cam lock fitting 35, the liquid applicator 52 can be separated allowing for easy access to the component parts for cleaning and servicing.

The liquid applicator 52 is connected to a first end of the light chamber 12 via the reducing tee socket 13, the bushing 17, the nipple 18 and the connector 19 (see FIG. 3). A strain relieve 30 is attached to the reducing tee socket 13. It is noted that the liquid applicator 52 and the foam generator 11 can basically be interchanged with each other.

The second embodiment enhances the car washing experience in the situation where a foamed detergent mixture is not required such as a rinsing stage, a pre-soak stage, or a waxing stage where once again the falling liquid absorbs the colored lighting and appears to be colored as it falls.

The invention claimed is:

1. A foam generating system for an automated carwash, the foam generating system comprising:
    a foam generator having a first end, a second end, a first input for receiving air, and a second input for receiving a detergent mixture, said foam generator transforming the air and the detergent mixture into foam;
    a light chamber attached to said first end of said foam generator and receiving the foam formed in said foam generator, said light chamber having a plurality of openings formed therein for dispensing the foam;
    a light bar disposed in said light chamber and having a plurality of lights for illuminating the foam as it is expelled via said openings; and
    said light chamber having an interior wall and said light bar having an exterior wall defining a gap therebetween, the foam flowing from said foam generator to said openings via said gap.

2. The foam generating system according to claim 1, further comprising nozzles disposed in said openings of said light chamber for ejecting the foam.

3. The foam generating system according to claim 1, wherein said light chamber has a removable cap for allowing access to and replacement of said light bar.

4. The foam generating system according to claim 1, further comprising a light flasher connected one of directly and wirelessly to said light bar for controlling an operation of said light bar.

5. The foam generating system according to claim 1, wherein said first input of said foam generator is an adjustable ball valve.

6. The foam generating system according to claim 1, wherein said second input of said foam generator is a full cone nozzle.

7. The foam generating system according to claim 1, wherein said plurality of lights of said light bar are LED lights.

8. The foam generating system according to claim 1, wherein said light bar has a waterproof housing being hydrocarbon insensitive.

9. The foam generating system according to claim 1, further comprising a reducing tee socket disposed between said foam generator and said light chamber.

10. The foam generating system according to claim 9, wherein said light bar has an end supported in said reducing tee socket.

11. A foam generating system for an automated carwash, the foam generating system comprising:
    a foam generator having a first end, a second end, a first input for receiving air, and a second input for receiving a detergent mixture, said foam generator transforming the air and the detergent mixture into foam;

a light chamber attached to said first end of said foam generator and receiving the foam formed in said foam generator, said light chamber having a plurality of openings formed therein for dispensing the foam;

a light bar disposed in said light chamber and having a plurality of lights for illuminating the foam as it is expelled via said opening; and said foam generator having a gator cam lock fitting for releasably connecting to said light chamber.

12. A carwash system for an automated carwash, the carwash system comprising:

an air source for supplying air;
a control valve;
a detergent source for supplying detergent and connected to said control valve;
a water source for supplying water and connected to said control valve, said control valve mixing the detergent with the water forming a foaming mixture;
a foam generating system, containing:
   a plurality of foam generators each having a first end, a second end, a first input connected to said air source for receiving the air, and a second input connected to said control valve and receiving the foaming mixture, said foam generators transforming the air and the foaming mixture into foam;
   light chambers, a respective one of said light chambers attached to said first end of each of said foam generators and receiving the foam formed in a respective one of said foam generators, said light chambers having a plurality of openings formed therein for dispensing the foam;
   light bars, a respective one of said light bars disposed in each of said light chambers and having a plurality of lights for illuminating the foam as it is expelled via said openings; and
   said light chamber having an interior wall and said light bar having an exterior wall defining a gap therebetween, the foam flowing from said foam generator to said openings via said gap.

13. A liquid applicator system for an automated carwash, the liquid applicator system comprising:

a liquid applicator having a first end, a second end, and an input for receiving a mixed solution;

a light chamber attached to said first end of said liquid applicator and receiving the mixed solution, said light chamber having a plurality of openings formed therein for dispensing the mixed solution; and a light bar disposed in said light chamber and having at least one light for illuminating the mixed solution as it is expelled via said openings.

14. The liquid applicator system according to claim 13, further comprising nozzles disposed in said openings of said light chamber for ejecting the mixed solution.

15. The liquid applicator system according to claim 13, wherein said light chamber has a removable cap for allowing access to and replacement of said light bar.

16. The liquid applicator system according to claim 13, wherein said light chamber has an interior wall and said light bar has an exterior wall defining a gap therebetween, the mixed solution flowing from said liquid applicator to said openings via said gap.

17. The liquid applicator system according to claim 13, wherein said input of said liquid applicator is an adjustable ball valve.

18. The foam generating system according to claim 13, wherein said at least one light is one of a plurality of lights being LED lights.

19. The liquid applicator system according to claim 13, wherein said light bar has a waterproof housing being hydrocarbon insensitive.

\* \* \* \* \*